US012262839B2

(12) United States Patent
Evangelisti et al.

(10) Patent No.: US 12,262,839 B2
(45) Date of Patent: Apr. 1, 2025

(54) MACHINE FOR PREPARING COFFEE

(71) Applicant: DE' LONGHI APPLIANCES S.R.L. CON UNICO SOCIO, Treviso (IT)

(72) Inventors: Paolo Evangelisti, Treviso (IT); Nicola Piovan, Treviso (IT)

(73) Assignee: De' Longhi Appliances S.R.L. Con Unico Socio, Treviso (IT)

(*) Notice: Subject to any disclaimer, the term of this patent is extended or adjusted under 35 U.S.C. 154(b) by 757 days.

(21) Appl. No.: 17/604,788

(22) PCT Filed: Apr. 16, 2020

(86) PCT No.: PCT/IT2020/050096
§ 371 (c)(1),
(2) Date: Oct. 19, 2021

(87) PCT Pub. No.: WO2020/213018
PCT Pub. Date: Oct. 22, 2020

(65) Prior Publication Data
US 2022/0175177 A1 Jun. 9, 2022

(30) Foreign Application Priority Data
Apr. 19, 2019 (IT) .................. 102019000006192

(51) Int. Cl.
A47J 31/36 (2006.01)
A47J 31/46 (2006.01)

(52) U.S. Cl.
CPC ......... A47J 31/3619 (2013.01); A47J 31/469 (2018.08)

(58) Field of Classification Search
CPC ..................... A47J 31/3619; A47J 31/469
See application file for complete search history.

(56) References Cited

U.S. PATENT DOCUMENTS 5,007,333 A * 4/1991 Sager .................. A47J 31/3614
99/289 R
5,823,096 A * 10/1998 Shih .................... A47J 31/3614
99/289 R (Continued)

FOREIGN PATENT DOCUMENTS

EP 0536616 A1 4/1993
EP 2254449 B1 12/2010
WO 2016124450 A1 8/2016

OTHER PUBLICATIONS

International Search Report for corresponding application PCT/IT2020/050096 filed Apr. 16, 2020; Mail date Oct. 1, 2020.

(Continued)

Primary Examiner — Sean M Michalski
(74) Attorney, Agent, or Firm — K&L Gates LLP

(57) ABSTRACT

An automatic machine for preparing beverages, in particular American coffee, including a unit to feed the coffee powder, a mobile infusion unit having an infusion cylinder which delimits an infusion chamber, and a hydraulic circuit configured to heat the water for the infusion and feed it to the infusion chamber, where the infusion unit has an expulsion piston slidable inside the infusion cylinder and delimiting at the lower part the infusion chamber, and a valve device provided with a valve body and a closing piston which can engage with the infusion cylinder in order to close the infusion chamber.

12 Claims, 3 Drawing Sheets

(56) References Cited

U.S. PATENT DOCUMENTS

| | | | |
|---|---|---|---|
| 2003/0116026 A1* | 6/2003 | Koning | A47J 31/3619 99/279 |
| 2005/0150389 A1* | 7/2005 | Carbonini | A47J 31/4403 99/279 |
| 2005/0193891 A1* | 9/2005 | Garson | A47J 31/3614 99/279 |
| 2014/0150664 A1 | 6/2014 | Corti | |

OTHER PUBLICATIONS

Written Opinion for corresponding application PCT/IT2020/050096 filed Apr. 16, 2020; Mail date Oct. 1, 2020.

* cited by examiner

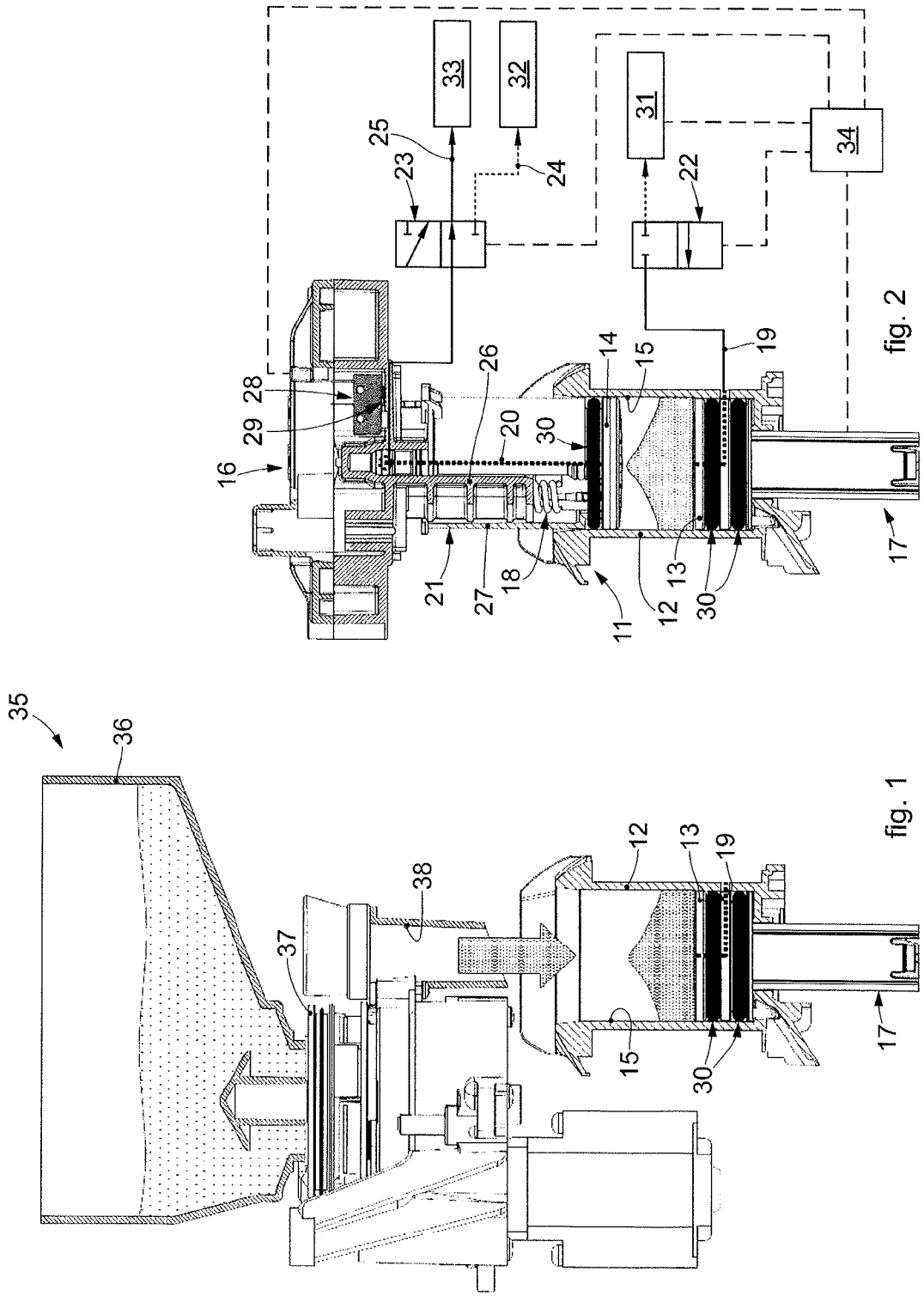

MACHINE FOR PREPARING COFFEE

TECHNICAL FIELD

Embodiments described here concern an automatic machine for preparing beverages, in particular for preparing American type coffee, suitable to automatically carry out the operations of loading the infusion chamber with the coffee powder, preparing and delivering the coffee beverage and discharging the used coffee powder.

BACKGROUND

Coffee machines for preparing American coffee are known, also called "drip coffee machines", comprising a water tank, a boiler, an infusion chamber in which a filter is positioned and into which the coffee powder is introduced on each occasion, and a receptacle located under the infusion chamber to receive the beverage.

The water heated by the boiler is fed to the infusion chamber where, due to the effect of gravity, it percolates through the coffee powder, extracting its aromatic substances so as to obtain the coffee beverage that gathers in the container.

Drip type coffee machines have a simple construction and a low production cost. One disadvantage of traditional machines is that they require a manual intervention by the user both to load the coffee powder and also to remove it at the end of the preparation of the beverage.

Furthermore, since the coffee beverage and the used coffee powder tend to dirty the container and the pipes with which they come into contact, these machines require frequent cleaning operations to ensure their correct functioning.

Partly automatic coffee machines are also known, which comprise a device for grinding coffee beans, a boiler for heating the flow of infusion water and a drawer where the filter is positioned. The coffee powder falls directly into the filter and subsequently percolation occurs with water falling from above. In addition to having to clean the filter, these machines have the disadvantage that the access zone of the coffee powder can easily become blocked, since it is located in contact with the infusion zone, and is therefore subjected to humidity.

Automatic coffee machines are also known, which comprise a device for grinding coffee beans, a boiler for heating the flow of infusion water, a mobile infusion unit comprising an infusion cylinder which defines an open infusion chamber, and a valve device, suitable to engage with the mobile infusion unit to close the infusion chamber.

The infusion cylinder is closed at the lower part by an expulsion piston disposed slidable therein, and configured to remove the used coffee powder at the end of the delivery of the beverage.

A pipe for feeding the flow of infusion water, passing through the valve device, and suitable to feed the water from above into the infusion chamber, and a pipe for delivering the coffee beverage connected to the bottom of the infusion chamber and passing through the expulsion piston are also present.

In addition, there is a discharge pipe through which, at the end of the delivery of the beverage, the residual water obtained by the compression of the used coffee powder is discharged.

The valve device of the known solution is particularly complex and unreliable, since it comprises inside it both the pipe for feeding the infusion water and also the hydraulic mechanisms to allow the liquid to transit through and toward the infusion chamber. Furthermore, since the residual water circuit shares at least part of the feed circuit, the latter can become dirty due to coffee powders dragged by it.

Other known machines also comprise, at the inlet of the beverage delivery pipe, and in correspondence with the expulsion piston, a frother valve suitable to create the froth typical of espresso coffee.

One disadvantage of the known solutions is that they are optimized for preparing espresso type coffee rather than for preparing American type coffee, and require complex valve devices to allow an infusion of the coffee powder at high pressure.

Document US-A-2014/0150664 describes an automatic machine for preparing espresso or American coffee, in which the residual liquid obtained from the compression of the used coffee powder at the end of the delivery of the coffee beverage, whether it is espresso or American coffee, is delivered into the receptacle in which the coffee beverage was poured.

Other known machines for preparing coffee, in particular of the espresso type, are described in EP-A-0 536 616, EP-A-2 254 449 and EP-A-3 253 263.

One purpose of the present disclosure is to provide a machine for preparing coffee of the "super-automatic" type, that is, substantially fully automatic, which is optimized for preparing low-pressure American type coffee.

Another purpose of the present disclosure is to provide a machine for preparing coffee that is simple to use.

Another purpose is to provide a machine for preparing coffee that is reliable and does not require manual cleaning interventions by the user.

Another purpose of the present disclosure is to provide a machine of the type as above for preparing American type coffee which allows to prepare different and even large quantities of beverage.

Another purpose is to perfect a method for preparing a beverage, in particular American coffee, which is reliable and safe for the user.

The Applicant has devised, tested and embodied the present disclosure to overcome the shortcomings of the state of the art and to obtain these and other purposes and advantages.

BRIEF SUMMARY

In accordance with the above purposes, the present disclosure concerns a so called super-automatic machine for preparing coffee, in particular American type coffee.

By "super-automatic" machine, here and hereafter in the description we mean a machine suitable to automatically perform all the operations required to prepare a coffee beverage, comprising at least the loading of a dose of coffee powder into an infusion chamber, the infusion of the powder with hot water, the delivery of the coffee beverage and the discharge of the used coffee powder.

According to some embodiments, the machine is in particular optimized for preparing American type coffee.

American type coffee and the machines for preparing it are normally classified according to particular standards that require meeting determinate requirements concerning infusion temperature, uniformity of extraction of the coffee powder, and others, which are different from those normally required in relation to espresso coffee.

The standards normally used are the Specialty Coffee Association (SCA) standard mainly used in North America, and the European Coffee Brewing Center (ECBC) standard.

These standards require that the final infused beverage has a concentration of aromas comprised between 1.15%-1.36% (SCA), or respectively 1.30%-1.55% (ECBC), considering a contact time of the water with the coffee powder comprised between about 4 min and 8 min operating at standard pressure temperature, as a function of the granulometry of the powder.

Furthermore, since the infusion of the coffee powder takes place at low pressure, unlike what occurs in the preparation of espresso coffee, it is necessary that the water uniformly wets the coffee powder passing through it in order to extract the quantity of aromas requested.

The machine according to the disclosure comprises a mobile infusion unit comprising an open infusion cylinder which can be loaded with a dose of coffee powder, an expulsion piston slidable inside the infusion chamber, and a valve device provided with a closing piston which can engage with the infusion cylinder in order to create a closed infusion chamber.

The machine also comprises, in association with the infusion chamber, a first pipe for feeding the infusion water and a second exit pipe, on the opposite side with respect to the first feed pipe.

The valve device comprises a fixed body, which the closing piston is connected to, and a body that is mobile with respect to the fixed body.

The valve device also comprises elastic members suitable to exert a determinate contrast force in an axial direction in order to maintain the mobile body stationary with respect to the fixed body, until a force greater than a predefined value is applied on it.

The valve device also comprises a safety device which can be selectively activated and deactivated by the reciprocal movement between the mobile body and the fixed body and suitable to limit the pressure inside the infusion chamber.

According to some embodiments, the safety device comprises a micro-switch positioned in correspondence with a lower end-of-travel position of the mobile body with respect to the fixed body.

In one embodiment, the micro-switch is of the normally open type, that is, normally kept active by the reciprocal contact between the fixed body and the mobile body.

When a pressure higher than a determinate predefined value is generated in the infusion chamber, such as to overcome the elastic force of the elastic elements associated with the mobile body, the latter is moved away from the fixed body, deactivating the micro-switch.

The micro-switch can therefore perform a safety function in the event that, during the infusion cycle, the pressure in the infusion chamber exceeds a maximum pressure value, for example equal to 3 bar, and it can also perform the function of end-of-travel of the mobile body with respect to the fixed body in order to define a desired compression force on the used coffee powder during a step of drying the latter.

According to some embodiments, the valve device is without hydraulic mechanisms, thus presenting a considerably simplified construction with respect to known solutions.

According to these embodiments, there can be a single delivery and discharge valve, disposed outside the valve device, at one end of the exit pipe, and suitable to selectively put the infusion chamber in communication either with a circuit for delivering the beverage to a receptacle or with a discharge circuit.

Thanks to this configuration, since the delivery and discharge valve is separate from the valve device, it is possible to invert the feed circuit and the exit circuit, as a function of requirements, without needing to modify the valve device.

The feed of water to the infusion chamber, therefore, can take place from the bottom or from the top, and the beverage will exit in the opposite direction.

Thanks to the provision of a single delivery and discharge valve, and of a single exit pipe, it is possible to choose whether to also deliver part of the residual water obtained from the compression of the used coffee powder into the receptacle.

In addition, by discharging the residual water through the same exit pipe of the beverage, the feed pipe remains clean, never coming into contact with coffee in powder or liquid form.

Embodiments described here also concern a method for preparing a beverage with the machine described above, wherein it provides to:

introduce a dose of coffee powder into an open infusion chamber of an infusion cylinder mobile in a first loading position;

position the mobile infusion cylinder in correspondence with a valve device, introducing a closing piston thereof inside the infusion cylinder to close the infusion chamber;

feed a flow of infusion water into the infusion chamber through a feed pipe and make the beverage exit through an exit pipe opposite the feed pipe and through a delivery pipe, and pour it into a receptacle;

at the end of the delivery of the beverage, dry the used coffee powder by compressing it between the closing piston and an expulsion piston disposed slidable inside the infusion chamber;

discharge the residual water obtained from the compressed used coffee powder through the exit pipe and a discharge pipe.

At the end of the drying step, the method also provides to transfer the infusion cylinder to a discharge position and drive the expulsion piston to remove the compressed used coffee powder from the infusion cylinder.

According to some embodiments, before compressing the used coffee powder, the method provides to switch a deflection valve located along the exit pipe to selectively put the exit pipe in communication with a discharge pipe, preventing the transit of the residual water toward the delivery pipe.

According to some embodiments, the method provides to compress the used coffee powder in the infusion chamber until the pressure inside it exceeds a predefined value such as to deactivate a safety device associated with the valve device.

According to some embodiments, the method provides that, if the pressure in the infusion chamber, during the preparation of the beverage, exceeds a predefined value such as to deactivate a safety device associated with the valve device, the preparation cycle of the beverage is stopped.

BRIEF DESCRIPTION OF THE DRAWINGS

These and other aspects, characteristics and advantages of the present disclosure will become apparent from the following description of some embodiments, given as a non-restrictive example with reference to the attached drawings wherein:

FIG. 1 is a schematic section view of a machine for preparing coffee according to the disclosure with the infusion unit in the position of loading a dose of coffee powder;

FIG. 2 is a schematic section view of a part of the machine of FIG. 1 with the infusion unit in an infusion position;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION

Figure 4:
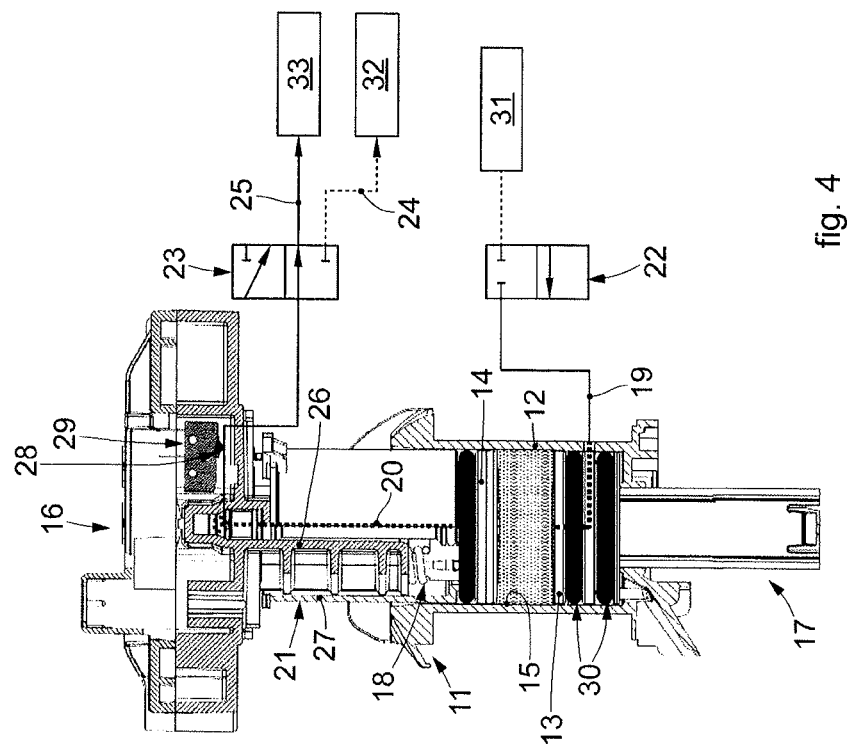
FIG. 4 is a schematic section view of a part of the machine of FIG. 1 with the infusion unit in a position of drying the used dose of coffee.

We will now refer in detail to the various embodiments of the present disclosure, of which one or more examples are shown in the attached drawings. Each example is supplied by way of illustration of the disclosure and shall not be understood as a limitation thereof. For example, the characteristics shown or described insomuch as they are part of one embodiment can be adopted on, or in association with, other embodiments to produce another embodiment. It is understood that the present disclosure shall include all such modifications and variants.

Embodiments described here concern a machine 10 for preparing coffee, in particular of the American type.

The machine 10 is advantageously a so-called "super-automatic" machine, that is, able to carry out the operations of loading the coffee powder, preparing and delivering the beverage, and expelling the used coffee powder in a completely automatic manner.

According to some embodiments, the machine 10 comprises a frame which delimits a containing body in which an infusion unit 11 is present.

The infusion unit 11 comprises a mobile infusion cylinder 12 into which a dose of coffee powder can be loaded on each occasion.

The infusion cylinder 12 is closed at the lower part by an expulsion piston 13 disposed slidable therein.

The infusion unit 11 also comprises a valve device 16 provided with a closing piston 14 which can engage in the infusion cylinder 12 to create a closed infusion chamber 15.

The infusion chamber 15 is formed with each operation of preparing a coffee beverage and is delimited laterally by the lateral surface of the infusion cylinder 12, at the lower part by the expulsion piston 13 and at the upper part by the closing piston 14.

The machine 10 comprises a drive device 17 configured to move the infusion cylinder 12 at least between a loading position, in which a dose of coffee powder is introduced into the infusion cylinder 12, an infusion position in which the cylinder 12 is engaged with the valve device 16 and in which the infusion of the coffee powder is carried out, and a position for discharging the dose of used coffee powder.

According to some embodiments, the infusion unit 11 comprises a feed pipe 19 through which the water for the infusion is fed from a hydraulic circuit 31 to the infusion chamber 15.

The infusion unit 11 also comprises an exit pipe 20 for the liquid to exit from the infusion chamber which develops in an opposite direction with respect to the feed pipe 19.

According to some embodiments, one of the two pipes 19, 20 develops through the expulsion piston 13 and the other pipe develops through the closing piston 14.

In the embodiment shown by way of example in the drawings, the feed pipe 19 passes through the expulsion piston 13 while the exit pipe 20 passes through the closing piston 14 and a valve body 21 of the valve device 16.

According to some embodiments, an intercepting valve 22 is disposed along the feed pipe 19 which can be selectively activated to allow or prevent the passage of water from the hydraulic circuit 31 along the feed pipe 19 and toward the infusion chamber 15.

The hydraulic circuit 31 normally comprises a pump (not shown) to feed the water from a tank, and heating devices (not shown) to heat the water for the infusion in transit to the desired temperature.

By way of example, the water for the infusion can be heated to a temperature comprised between 85° C. and 100° C.

According to preferred embodiments, the water for the infusion can be heated to between 90° and 96°, even more preferably between 92° and 94°.

According to some embodiments, a deflection valve 23 is provided along the exit pipe 20 which can be selectively activated in order to put the exit pipe 20 in communication with a delivery pipe 24 or with a discharge pipe 25.

The delivery pipe 24 is configured to deliver the infused beverage into a receptacle 32 of a user, while the discharge pipe 25 is configured to take the residual water deriving from the drying of the dose of used coffee powder into a collection tray 33.

According to some embodiments, the deflection valve 23 is advantageously disposed in a segment of the exit pipe 20 outside the valve body 21.

According to this solution, the valve device 16 does not have any hydraulic mechanism, but only a passage for the transit of liquid, so that its construction is extremely simplified.

According to some embodiments, the valve body 21 comprises a fixed body 26 and a body 27 that is mobile with respect to the fixed body 26.

According to some embodiments, the valve device 16 comprises elastic members 18 configured to keep the mobile body 27 in position with respect to the fixed body 26, which are suitable to withstand a predefined value of force acting in an axial direction.

According to some embodiments, the elastic members 18 can be configured to contrast a force that acts in the axial direction and generates a pressure greater than 40 Kg/m$^2$. This pressure value is in fact the one necessary to compress and dry the used coffee powder.

According to variant embodiments, the elastic members 18 can be configured to contrast a force that acts in the axial direction and generates a pressure greater than 50 Kg/m$^2$, for example up to 60 Kg/m$^2$.

In general, however, the conformation and the elastic constant of the elastic members 18 can be chosen as a function of the size of the infusion chamber 15 and therefore of the maximum quantity of coffee powder that can be contained therein.

According to some embodiments, the elastic members 18 are connected to the mobile body 26 and are configured to move it with respect to the fixed body 27 when an axial force greater than the predefined value is exerted.

The valve device 16 also comprises a safety device 28 which can be selectively activated/deactivated by the reciprocal movement between the fixed body 26 and the mobile body 27.

The safety device 28, in particular, is configured to ensure that the axial thrust exerted on the mobile body 27 does not exceed a determinate threshold value.

According to some embodiments, the safety device 28 comprises a micro-switch 29 disposed in an intermediate position between the fixed body 26 and the mobile body 27.

According to some embodiments, the micro-switch 29 is of the normally open type, kept active by the reciprocal contact between the fixed body 26 and the mobile body 27.

When the force exerted on the mobile body 27 exceeds a predefined threshold value, the elastic members 18 move the mobile body 27 away from the fixed body 26 deactivating the micro-switch 29.

Furthermore, the sizing of the elastic members 18 can be such as to guarantee that the pressure in the infusion chamber 15 during the preparation of the beverage remains below a maximum set value, for example lower than 3 bar (~$3 \times 10^5$ Pa).

In particular, if in the infusion chamber 15, during the preparation of the beverage, the pressure exceeds a maximum value, such as to overcome the force exerted by the elastic members 18, which is correlated to the load for which they are calibrated, the micro-switch 29 is deactivated—moving the mobile body 27 away from the fixed body 26—and the beverage preparation cycle is stopped.

This allows to obtain a low pressure infusion of the beverage, typically suitable to prepare American type coffee, for example of about 2 bar (~$2 \times 10^5$ Pa).

According to some embodiments, the safety device 28 can also act as an end-of-travel indicator for the movement of the infusion cylinder 12 with respect to the valve device 16.

During the infusion, the infusion cylinder 12 is engaged with the closing piston 14 of the valve body 16, which closes the infusion chamber 15 at the upper part.

In the infusion position, the dose of ground coffee present in the infusion chamber 15 is not subjected to any compression.

According to some embodiments, at the end of the delivery of the beverage, the infusion cylinder 12 can be moved by means of the drive device 17 toward the valve body 21, so as to thrust the dose of used coffee powder toward the closing piston 14 and compress it, extracting the residual water thereof which can be discharged through the exit pipe 20 and the discharge pipe 25.

The movement of the infusion cylinder 12 with respect to the closing piston 14 is contrasted by the elastic force of the elastic elements 18 until the first predefined value is reached which entails the movement of the mobile body 27 away from the fixed body 26, and the deactivation of the micro-switch 29 which, in this case, acts as an end-of-travel indicator.

In this way, the micro-switch 29 allows both to control the pressure inside the infusion chamber 15 during the preparation of the infused beverage, and also to control the compression force imparted on the used coffee powder, preventing possible damages to the valve device 16 and the machine 10.

According to some embodiments, the machine 10 comprises a control and command unit 34 configured to regulate its functioning.

The control and command unit 34 in particular can regulate the functioning of the infusion unit 11 and of the devices for feeding and heating the infusion water as a function of a command to prepare a beverage received from a user by means of a suitable interface (not shown).

For example, the user, by means of the interface, can command the start of a preparation cycle of a beverage, and possibly indicate the quantity of beverage to be prepared, for example a cup, half a carafe or a carafe.

According to some embodiments, the machine 10 comprises a unit 35 to feed the coffee powder configured to feed a dose of coffee powder into the infusion chamber 15.

According to some embodiments, the unit 35 to feed the coffee powder comprises a hopper 36 to feed the coffee, connected to a conveying channel 38 suitable to convey the coffee powder toward the loading zone.

According to some embodiments, the feed hopper 36 can be configured to contain the already ground coffee powder, and be provided with selector devices to allow or prevent the passage thereof toward the conveying channel 38.

According to other embodiments, the feed hopper 36 can be configured to contain coffee beans and the machine 10 can comprise a grinding device 37 connected thereto configured to grind the necessary quantity of coffee powder with each request for a beverage to be prepared, and supply it to the conveying channel 38.

According to other embodiments, a door to manually load the coffee can also be provided, through which a user can directly introduce the coffee powder through the conveying channel 38 into the infusion cylinder 12 positioned in the loading zone.

The functioning method of the machine 10 for preparing beverages is described below.

When a beverage preparation cycle is started, the drive device 17 positions the infusion cylinder 12 in the loading position to receive a dose of coffee powder correlated to the quantity of beverage to be prepared (FIG. 1).

The dose can be comprised, by way of example, between 10 g and 30 g as a function of the quantity of final beverage to be obtained, for example a cup, half a carafe, or a carafe.

The dose of coffee powder can advantageously be obtained by grinding a determinate quantity of beans with the grinding device 37 provided in the machine 10.

Subsequently, the infusion cylinder 12 is moved into the infusion position, in which it is engaged with the valve device 16 so that the closing piston 14 positions itself at the mouth of the infusion cylinder 12 and closes the infusion chamber 15 at the upper part, without compressing the coffee powder.

According to some embodiments, it can be provided that the infusion cylinder 12 always positions itself in the same position with respect to the valve body 21, regardless of the quantity of coffee powder therein.

In this step of the cycle the intercepting valve 22 is closed and the deflection valve 23 is in the discharge configuration (FIG. 2).

Figure 3:
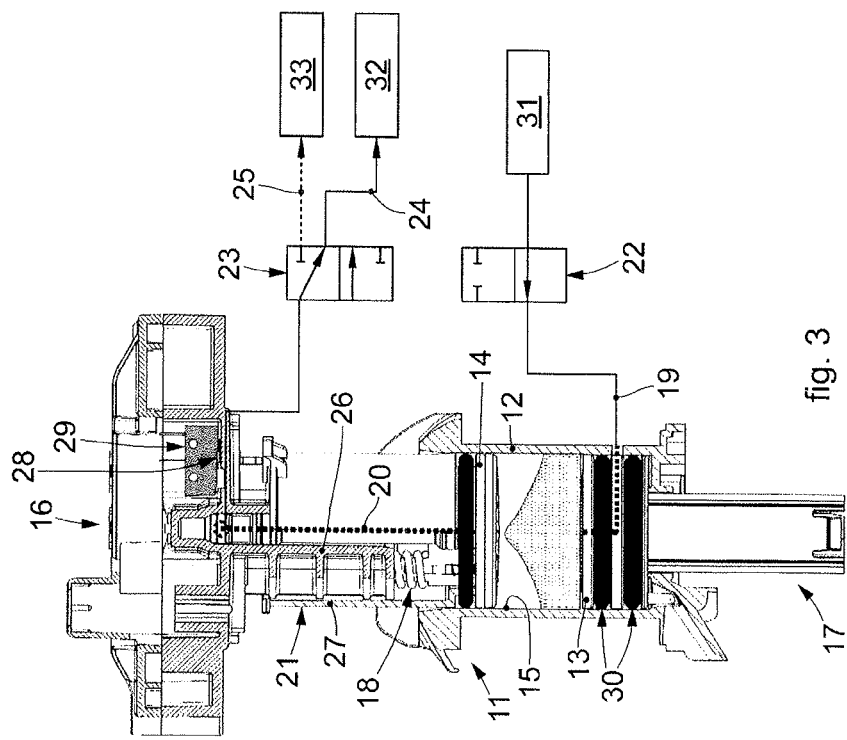
FIG. 3 is a schematic section view of a part of the machine of FIG. 1 with the infusion unit during the infusion.

Once the infusion cylinder 12 has been positioned, the intercepting valve 22 is opened, the deflection valve 23 is placed in the delivery configuration (FIG. 3) and the heating device and pump are commanded in order to feed the infusion water along the feed circuit 19 and inside the infusion chamber 15.

The water for the infusion at the desired temperature percolates through the coffee powder and exits through the exit pipe 20 and the delivery pipe 24 toward the receptacle 32.

At the end of the infusion and delivery of the beverage, the intercepting valve 22 is returned to the closed condition and the deflection valve 23 is taken to the discharge configuration.

According to some embodiments, the water can be fed to the infusion chamber 15 from below and the infused beverage can exit the infusion chamber 15 upward, upon reaching the overflow point inside the chamber itself.

According to other variants, it is possible to invert the hydraulic circuit, and the water can be fed to the infusion chamber 15 from above, causing the infused beverage to exit from below.

Subsequently, a step of drying the used coffee dose is carried out, in which the infusion cylinder 12 is moved axially toward the closing piston 14 in order to compress the wet used coffee powder between the expulsion piston 13 and the closing piston 14.

The compression force exerted on the coffee powder is contrasted by the elastic members 18, until the compression force exceeds the contrast force of the elastic members 18, causing the micro-switch 29 to be deactivated and therefore the drive device 17 to stop (FIG. 4).

In particular, when the contrast force exerted by the elastic elements 18 is exceeded, this causes the mobile body 27 to move away from the fixed body 26 and consequently the deactivation of the micro-switch 29.

During the compression, the residual water is discharged through the exit pipe 20 and the discharge pipe 25 toward the collection tray 33.

Figure 5:
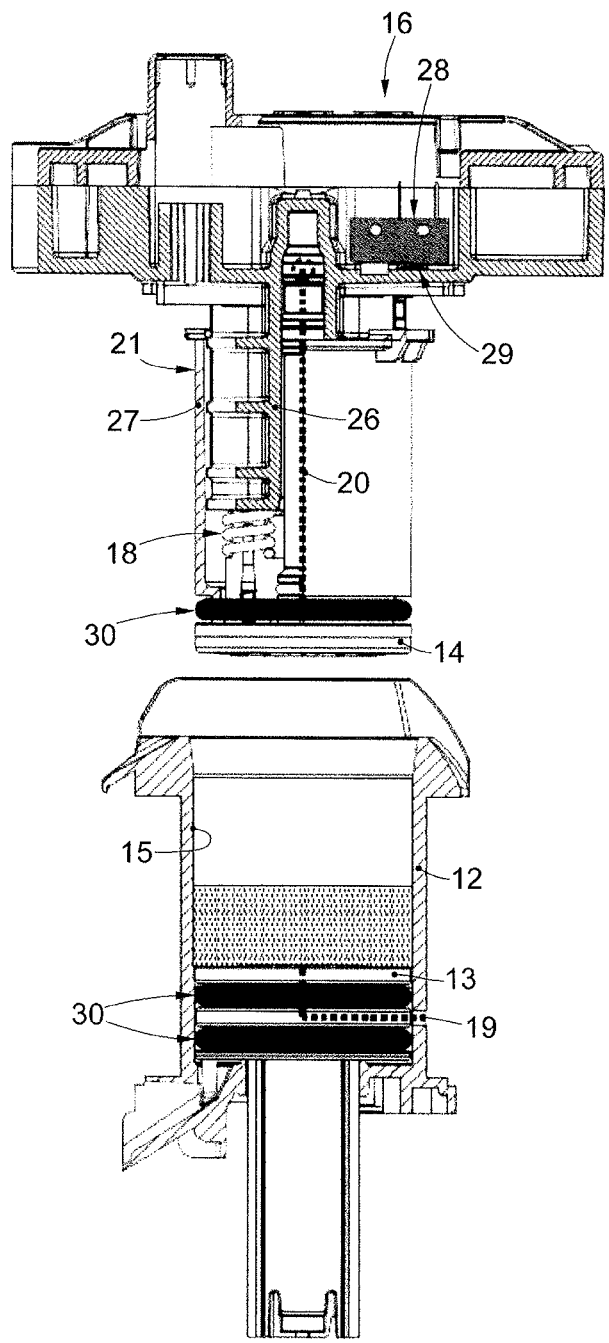
FIG. 5 is a schematic section view of a part of the machine of FIG. 1 with the infusion unit in the position of extraction of the used dose of coffee.
Figure 6:
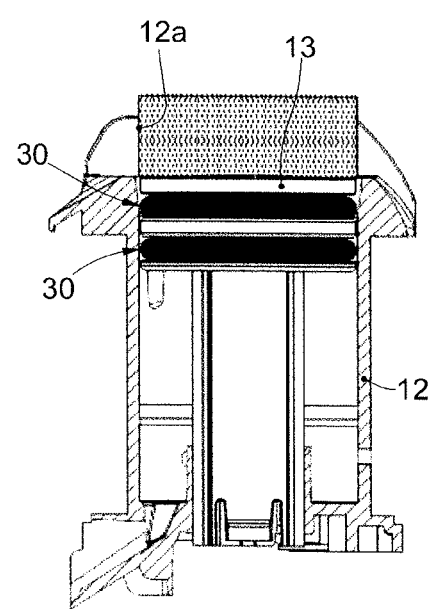
FIG. 6 is a schematic section view of a part of the machine of FIG. 1 with the infusion unit in the position of expulsion of the used dose of coffee.

At the end of the drying step, the infusion cylinder 12 is disengaged from the valve device 16 (FIG. 5) and is transferred by the drive device 17 to a third position of extraction and expulsion of the dose of used coffee.

In this position, the expulsion piston 13 is driven to make it slide inside the infusion cylinder 12 and thrust the dose of compressed used coffee powder toward the open end 12*a* in order to remove it.

According to some embodiments, the expulsion pistons 13 and the closing pistons 14 have a section substantially mating with that of the infusion cylinder 12.

According to some embodiments, one or more sealing members 30 can be provided associated with the expulsion 13 and/or closing 14 pistons in order to guarantee that the liquid present in the infusion chamber 15 can only flow along the feed pipe 19 or the exit pipe 20.

The sealing members 30 can be made of deformable plastic material, and can be suitable both to act as a hydraulic seal with respect to the lateral wall of the infusion cylinder 12, and also to remove possible residues of coffee powders from the lateral wall thereof, keeping it substantially clean.

By way of example, two sealing members 30 can be associated with the expulsion piston 13 in order to obtain a double hydraulic seal, so as to prevent unwanted leakages of liquid from the infusion chamber 15 from occurring.

According to other variants, the sealing members 30 can be integrated in the expulsion 13 and/or closing 14 pistons, or the expulsion 13 and/or closing 14 pistons themselves can be made at least in part of deformable plastic material.

It is clear that modifications and/or additions of parts or steps may be made to the machine 10 and to the method for preparing beverages as described heretofore, without departing from the field and scope of the present disclosure.

It is also clear that, although the present disclosure has been described with reference to some specific examples, a person of skill in the art shall certainly be able to achieve many other equivalent forms of machine 10 or method for preparing beverages, having the characteristics as set forth in the claims and hence all coming within the field of protection defined thereby.

The invention claimed is:

1. Automatic machine for preparing beverages, in particular American coffee, comprising:
   a unit to feed the coffee powder,
   a mobile infusion unit comprising an infusion cylinder which delimits an infusion chamber, and
   a hydraulic circuit configured to heat the water for the infusion and feed the water to the infusion chamber,
   wherein said infusion unit comprises an expulsion piston slidable inside the infusion cylinder and delimiting at a lower part said infusion chamber, and a valve device provided with a valve body and a closing piston which can engage with the infusion cylinder in order to close said infusion chamber,
   wherein said infusion chamber is associated with a first feed pipe for the infusion water connected to said hydraulic circuit and with an exit pipe, which extends from a side opposite said first feed pipe, and configured to take to the exit of said infusion chamber both a coffee beverage obtained by infusion of said coffee powder, and also residual water obtained by means of a compression of used coffee powder between said expulsion piston and said closing piston,
   the automatic machine further comprising a deflection valve which can be selectively activated to put said exit pipe in communication with a delivery pipe configured to deliver the infused beverage into a receptacle of a user, or with a discharge pipe configured to discharge the residual water deriving from a drying of the used coffee powder.

2. Automatic machine as in claim 1, wherein said first feed pipe extends through said expulsion piston, and said exit pipe extends through said closing piston and said valve body of said valve device.

3. Automatic machine as in claim 2, further comprising an intercepting valve, disposed along said feed pipe, and which can be selectively activated to allow or prevent the passage of the water fed by said hydraulic circuit.

4. Automatic machine as in claim 1, wherein said deflection valve is disposed in a segment of said exit pipe outside said valve device.

5. Automatic machine as in claim 1, wherein said valve device comprises a valve body comprising a fixed body connected to said closing piston, a body that is mobile with respect to the fixed body and elastic members configured to maintain said mobile body in position with respect to said fixed body and suitable to sustain a predefined value of force acting in an axial direction.

6. Automatic machine as in claim 5, wherein said valve device comprises a safety device which can be selectively activated/deactivated by a reciprocal movement between said fixed body and said mobile body and configured to limit a pressure inside said infusion chamber.

7. Automatic machine as in claim 6, wherein said safety device comprises a micro-switch disposed in an intermediate position between said fixed body and said mobile body, said micro-switch being normally open and kept active by the reciprocal contact between said fixed body and said mobile body.

8. Automatic machine as in claim 1, further comprising a collection tray fluidically connected to said discharge pipe.

9. Method for preparing a beverage with an automatic machine as in claim 1, comprising:
   introducing a dose of coffee powder into said infusion cylinder, mobile in a loading position;

positioning said infusion cylinder in correspondence with said valve device, and closing said infusion chamber by introducing said closing piston inside said infusion cylinder;

feeding a flow of infusion water from said hydraulic circuit into said infusion chamber through a first feed pipe and delivering an infused beverage through an exit pipe opposite said feed pipe, and through a delivery pipe, and pour it into a receptacle;

at the end of the delivery of the beverage, drying the used coffee powder in said infusion chamber by compressing it between said closing piston and said expulsion piston;

discharging the residual water obtained from said compressed used coffee powder through said exit pipe;

transferring said infusion cylinder to a discharge position and driving said expulsion piston to remove said compressed used coffee powder from said infusion cylinder, wherein before compressing said used coffee powder the method providing to switch a deflection valve located along said exit pipe to selectively put the latter in communication with a discharge pipe for the residual water, preventing the transit of the residual water toward said delivery pipe.

10. Method as in claim 9, wherein before delivering the infused beverage, said method providing to switch said deflection valve to selectively put said exit pipe in communication with said delivery pipe.

11. Method as in claim 9, further comprising compressing the used coffee powder in said infusion chamber until the pressure inside it exceeds a predefined value such as to deactivate a safety device associated with said valve device.

12. Method as in claim 10, wherein, if the pressure in the infusion chamber, during the delivery of said beverage, exceeds a predefined value such as to deactivate a safety device associated with said valve device, the method comprises stopping the preparation cycle of said beverage.

* * * * *